Registered Aug. 12, 1930 Re. 17,771

UNITED STATES PATENT OFFICE

VERE B. BROWNE, OF BRACKENRIDGE, PENNSYLVANIA

METHOD OF MAKING MAGNETIC ALLOYS

No Drawing. Original No. 1,570,229, dated January 19, 1926, Serial No. 16,838, filed March 19, 1925. Application for reissue filed March 17, 1930. Serial No. 436,644.

This invention relates to a method of manufacturing silicon iron.

Silicon iron or so called silicon steel is now largely used as a magnetic alloy in the manufacture of certain parts of electrical apparatus on account of its high degree of magnetic permeability and low degree of magnetic hysteresis and this invention has particularly to do with the manufacture of silicon iron for use as a magnetic alloy.

The highest grades of silicon iron now obtainable commercially have a silicon content usually ranging from 3.5% to 4.5% and a carbon content ranging from .04% to .08%. It has been known for some time that the value of silicon iron as a magnetic alloy is not only determined by its silicon content but by its soundness and purity as well. Recent research on this subject has shown that carbon also plays an important part in the value of such material and that a sound carbonless silicon iron or the proper silicon content would have practically no magnetic loss.

Small laboratory quantities of silicon iron having an extremely low carbon content have been produced in a vacuum furnace and by methods which are wholly impractical for commercial production on a large scale.

In an application for United States Letters Patent filed by me, and serially numbered 16,837, I have disclosed a method of producing sound silicon iron alloys, that is, alloys that are substantially free from slag and other solid inclusions such as silica.

An object of the invention of the present application is to provide a method by means of which silicon iron having a silicon content such as is desirable in a magnetic alloy and a carbon content of not over .03% can be produced commercially and in large quantities.

A further object of this invention is to provide a method by means of which silicon iron having a silicon content in excess of 3% and a carbon content of not over .03% can be produced at a relatively low cost and in large quantities.

A still further object of this invention is to provide a method by means of which silicon iron free from sulphur and phosphorus and having a silicon content in excess of .5%, and a carbon content of not over .03% can be produced commercially and in large quantities.

These as well as other objects which will be apparent to those skilled in the art to which this invention relates I attain by means of the method and the steps thereof described in the specification and particularly set forth in the claims forming part of this application for Letters Patent.

The method of this invention broadly consists in refining iron in a furnace and in removing from the molten iron as much carbon as is possible by standard methods, then in passing air through the molten iron until all traces of carbon are removed and then in adding the desired amount of silicon to the carbon free iron.

The iron may be refined in either an open hearth furnace or in an electric arc furnace. It is generally more difficult to produce refined low carbon iron in an electric arc furnace than it is in an open hearth furnace, because carbon vapor given off by the carbon electrodes in the arc furnace is absorbed by the molten iron. I have found, however that in practicing my invention I am able to utilize either an open hearth furnace or an electric arc furnace and that in either furnace I can produce an iron that is practically carbonless.

By adding to this practically carbonless iron ferrosilicon containing not only .2% of carbon I can produce silicon iron having a carbon content not greater than .03% and at the same time having a silicon content as high as 5%.

In practicing the method of this invention I produce refined iron in either an open hearth or in an electric arc furnace according to standard practices. After the iron is refined I reduce the carbon content thereof according to standard practice, by adding iron ore to the bath until there is no further reaction and therefore no further carbon reduction.

When the point is reached at which there is no further carbon reduction by the addition of more iron ore I introduce a number of pipes into the bath and pass air through these to the bottom of the bath. This air, upon issuing from these pipes, comes into intimate contact with all parts of the bath and oxidizes the remaining carbon.

These pipes will vary in size and number according to the size of the bath. They are preferably connected to a common header or line which in turn is connected to a suitable source of air under pressure such as a blower or compressor. Where a cheap supply of oxygen is obtainable it is desirable to surcharge the air with oxygen and, of course, oxygen alone can be used with beneficial results. While it is not necessary to preheat the air this may be done if desired.

While as I have said the iron can be refined in either an open hearth or in an electric arc furnace, I prefer an electric arc furnace since, in such a furnace, I can maintain a reducing atmosphere and therefore can eliminate all of the sulphur and phosphorous as well as the carbon. I do this by using progressive slags on the surface of the bath. I first use an oxidizing slag and thereby remove the phosphorus and a portion of the carbon. I then remove this slag and replace it by a reducing slag and thereby remove the sulphur. The reducing slag is then removed and replaced by another oxidizing slag. It is during the period of this second oxidizing slag that I introduce the air for oxidizing the remaining carbon.

When the carbon has been removed I tap from the furnace a ladleful of this carbonless iron and make the silicon addition thereto. This is preferably done by placing in the ladle (before the molten carbonless iron is tapped thereinto) the necessary amount of silicon to produce an alloy of the desired composition.

The silicon is preferably added to the ladle in the form of ferrosilicon and this is preferably heated before it is placed in the ladle. The ferrosilicon I use is preferably that produced electrically and is of the highest grade obtainable and having a carbon content of not over .2%.

By using such ferrosilicon I can obtain silicon iron having a silicon content ranging from 3.5% to 4.5% with a carbon content of not over .03%.

I have found that by this method I am able to produce silicon iron that is superior as a magnetic alloy to any heretofore produced commercially. It can be produced at a relatively low cost and in any quantity desired. I also find that I am able, at only a slight increase in cost over the present commercial methods of manufacture, to obtain silicon iron having a silicon content as high as 4.5% and a carbon content that usually runs well below but never over .03%.

Having thus described my invention what I claim is:

1. The method of making silicon iron having a silicon content sufficient to adapt it for use as a magnetic alloy and a carbon content of not over .03%, which consists in refining iron, in reducing the carbon in the refined iron by making additions of iron ore to the bath until no further reduction of carbon is obtained by such additions, then in causing air or other oxidizing gas to permeate the bath until substantially all of the remaining carbon is removed, then in removing metal from the bath and making the necessary silicon additions to the removed metal.

2. The method of making silicon iron having a silicon content sufficient to adapt it for use as a magnetic alloy and a carbon content of not over .03%, which consists in refining iron in an open hearth or electric arc furnace, in reducing the carbon in the refined iron by making additions of iron ore to the bath until no further reduction of carbon is obtained by such additions, then in causing air or other oxidizing gas to permeate the bath until substantially all of the remaining carbon is removed, then in tapping metal from the furnace and making the necessary silicon addition to the metal thus removed.

3. The method of making silicon iron having a silicon content of at least 3% and a carbon content of not over .03% which consists in refining iron in an open hearth or electric arc furnace, in reducing the carbon in the refined iron by making additions of iron ore thereto until no further substantial reduction of carbon can be obtained by further additions, then in causing air or other oxidizing gas to permeate the bath until substantially all of the remaining carbon is removed, then in tapping metal from the furnace into a ladle and adding silicon to the metal in the ladle and then in casting such metal into ingots.

4. The method of making silicon iron having a silicon content sufficient to adapt it for use as a magnetic alloy and a relatively low carbon content, which consists in refining iron in an open hearth or electric arc furnace, in reducing the carbon in the refined iron by adding iron ore thereto, in introducing air into the bottom of the bath in the furnace in sufficient quantity and for the necessary length of time to remove substantially all of the remaining carbon, in tapping metal from the furnace into a ladle and in adding thereto a sufficient quantity of ferrosilicon having a carbon content of not over .2% to bring the silicon content of the finished alloy to at least 3% and then in casting such alloys into ingots.

5. The method of making silicon iron having a silicon content sufficient to adapt it for use as a magnetic alloy and a relatively low carbon content, which consists in refining iron in an open hearth or electric arc furnace, in reducing the carbon in the refined iron by adding iron ore thereto, in introducing air into the bottom of the bath in the furnace in sufficient quantity and for the necessary length of time to remove substantially all of the remaining carbon, in tapping metal from the furnace into a ladle and in adding thereto a sufficient quantity of ferrosilicon having a carbon content of not over .2% to bring the silicon content of the finished alloy to at least .5% and then in casting such alloys into ingots.

6. The method of making silicon iron having a silicon content sufficient to adapt it for use as a magnetic alloy and a relatively low carbon content, which consists in refining iron in an open hearth or electric arc furnace, in reducing the carbon in the refined iron by adding iron ore thereto, in introducing air into the bottom of the bath in the furnace in sufficient quantity and for the necessary length of time to remove substantially all of the remaining carbon, in tapping metal from the furnace into a ladle and in adding thereto a sufficient quantity of ferrosilicon having a carbon content of not over .2% to bring the silicon content of the finished alloy to the point desired.

7. The method of making silicon iron having a silicon content of at least 2% and a carbon content of not over .03% which consists in refining iron in an oxidizing atmosphere and in utilizing an oxidizing slag to remove the phosphorus and part of the carbon, in removing such slag and replacing the same by a reducing slag whereby the sulphur is removed, in replacing the reducing slag by an oxidizing slag, then in causing air or other oxidizing gas to permeate the bath until substantially all of the remaining carbon is removed, then in tapping metal from the bath into a ladle and in making the necessary silicon addition to the metal in the ladle and then in casting the metal into ingots.

In testimony whereof, I have hereunto subscribed my name this 11th day of March, 1930.

VERE B. BROWNE.